Aug. 17, 1965    R. W. HANDMANN    3,201,216
APPARATUS FOR PRODUCING ELECTRONIC TUBE STEMS
Filed Dec. 19, 1960    3 Sheets-Sheet 2

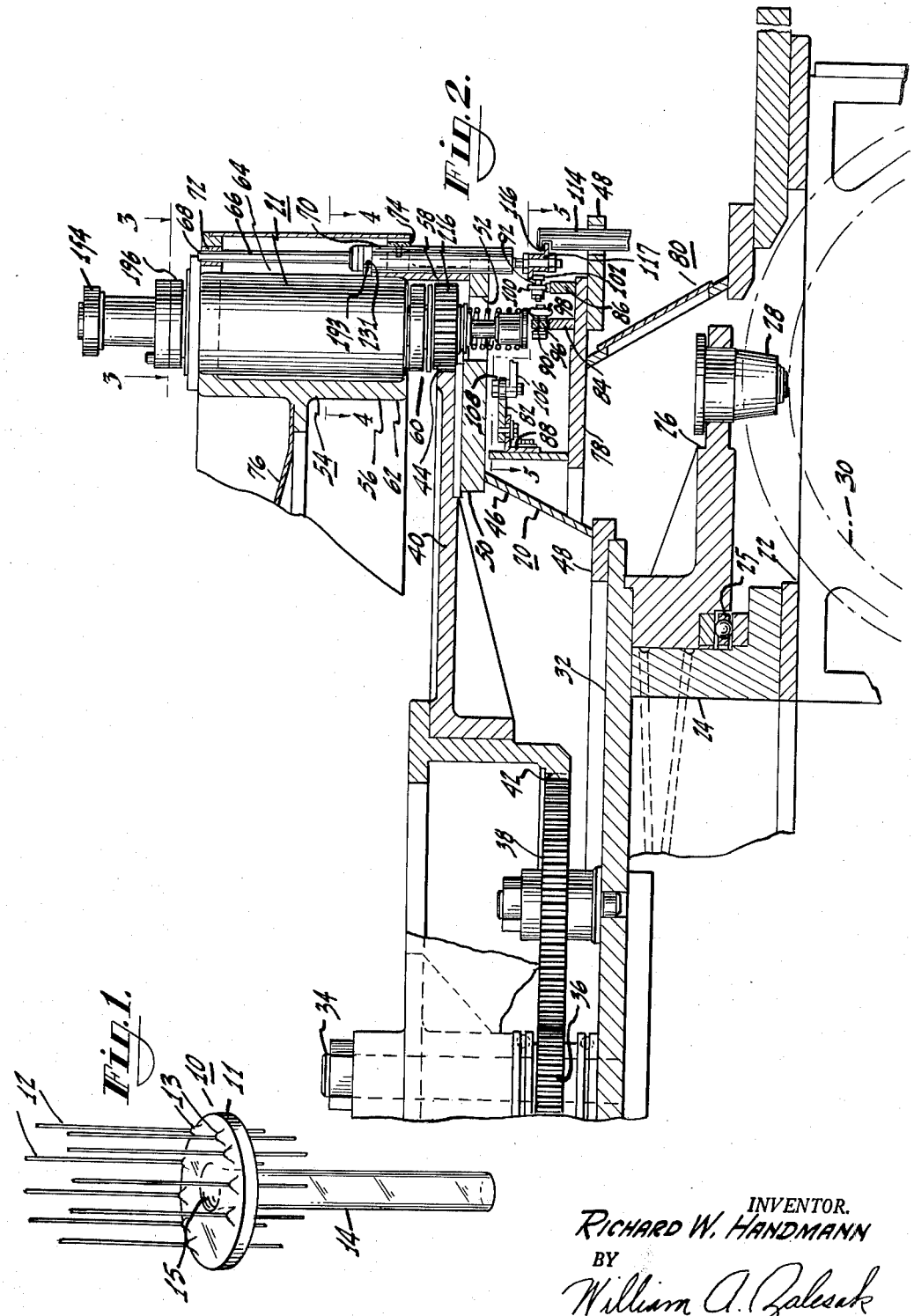

INVENTOR.
RICHARD W. HANDMANN
BY
William A. Balesak
Attorney

Aug. 17, 1965   R. W. HANDMANN   3,201,216
APPARATUS FOR PRODUCING ELECTRONIC TUBE STEMS
Filed Dec. 19, 1960   3 Sheets-Sheet 3
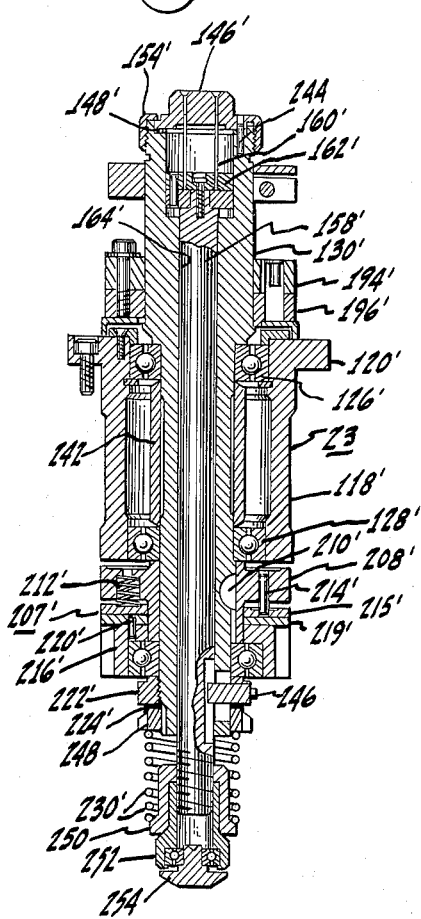
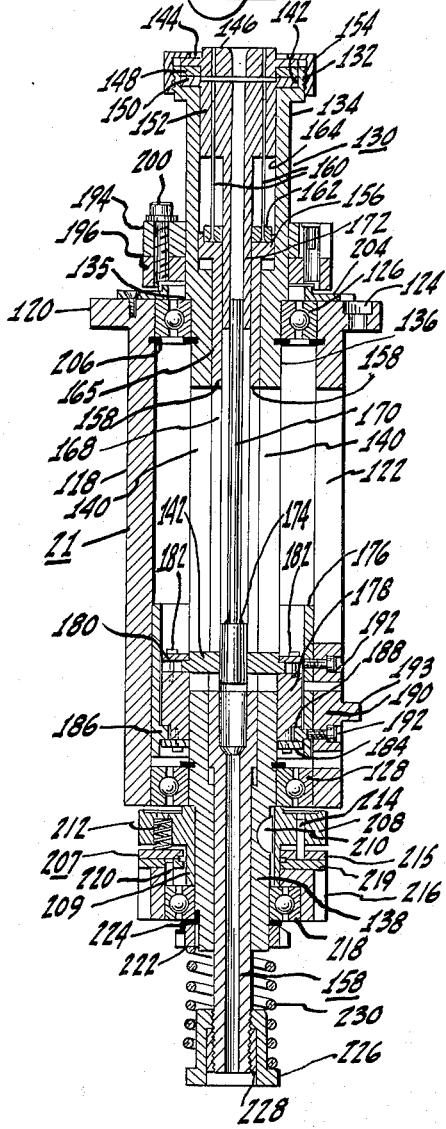
INVENTOR.
RICHARD W. HANDMANN
BY
William A. Zalesak
Attorney

United States Patent Office 3,201,216
Patented Aug. 17, 1965

3,201,216
APPARATUS FOR PRODUCING ELECTRONIC TUBE STEMS
Richard Walter Handmann, Fair Lawn, N.J., assignor to Radio Corporation of America, a corporation of Delaware
Filed Dec. 19, 1960, Ser. No. 76,905
2 Claims. (Cl. 65—138)

This invention relates to automatic apparatus for producing stems for electronic tubes such as vacuum tubes. An electronic tube stem comprises a number of conductive leads, usually seven or nine in number, each extending through a glass disk or button in a direction perpendicular to the plane of the disk. The pins are arranged in an array, usually circular and with equal spacings between the pins, except at one point along the circle, to provide an indexing means for the tube of which the stem will become a part.

Such a stem is usually made by inserting the leads in holes in the rotatable lower portion of a stem mold assembly which is mounted on an indexable turret. Then a glass cylinder is placed on the lower stem mold around, or within, the leads (or both) and then the leads and the glass cylinder are heated and the glass cylinder is pressed until it becomes a disk in which the central portion of the leads are embedded. Each of these operations takes place at an indexed position of the turret. During the heating operation, the leads and the glass cylinder, and therefore the lower mold, are rotated so that they may be heated uniformly. During the pressing step, the upper portion of the mold is pressed down on the glass cylinder. At this time, the upper mold is either rotated in synchronism with and in properly indexed relation to the lower mold, or the lower mold is stopped in properly indexed position with respect to the stationary upper mold, whereby, when the upper mold is brought down to pressing position, the leads will extend into the lead receiving holes in the upper mold.

In my machine, as described hereinafter, the lower mold is stopped in indexed position; however, my stem assembly hereinafter disclosed may be used either in an automatic stem machine in which the lower mold is rotated during pressing operation or in a machine in which the lower mold is stationary during such operation. Furthermore, at the loading and unloading position of the turret, the lower mold stops in the proper indexed position with respect to the lead feeding means and the stem unloading means. The stopping means should be so arranged that it will be out of the heating zone to prevent injury thereto by application of heat thereto.

In the process of heating the partially formed stem, it should be heated in a uniform manner, and therefore, the partially formed stem is raised off of the lower mold a sufficient distance so that the heating flame can be effective to heat the lower surface of the partially formed stem. Also, when the stem is completed, the stem is taken out of the mold and the pin receiving holes in the lower mold are cleared out in preparation for making the next stem.

In a modified stem, an exhaust tube extends from the stem, there being a hole through the stem button communicating with the exhaust tube. In making such a stem, the pins are inserted in the lower mold and the glass cylinder is supplied thereto as described above, and the exhaust tube is put into a hole provided therefor in the lower mold. This exhaust tube, originally, and until seal-off of the tube of which the stem becomes a part, extends many times as far from the glass disk as do the leads. In the process of making a tubulation-attached stem, the tubulation or tube is moved up and down the proper distance to keep the end of the tube engaged with the partially formed stem, which, as noted above, is moved up and down with respect to the mold during the manufacturing process to enable properly uniform heating. Furthermore, for proper sealing of the tube to the glass disk or button, there should be a small amount of relative motion between the tube and the bottom during heating. When the tube-attached stem is completed it is removed from the lower mold. In some instances, the tube breaks off in the mold and, for the production of further tube-attached stems, the pin holes as well as the tube hole in the lower mold must be cleaned out to make an opening for the insertion of further pins and a further exhaust tube. Due to the relatively great length of the tubulation before seal-off, as compared to the length of the pins below the disk, the stroke of an exhaust tube clean-out or ejector rod is many times as long as the stroke of the lead hole clean-out pins. A head in which the clean-out pins and the ejector lead is integrally fastened together would have to be designed for the longer stroke of the tube ejector rod and therefore a stem head assembly of greater length, long enough to include integral ejecting means would become necessary. Use of such a long stem head assembly would require a large stem making machine built to fit such a long stem head assembly.

An automatic stem machine comprises a turret which may have thirty or more stem head assemblies, each including a lower stem mold and means for rotating it and for cleaning out the lead holes and the exhaust tube holes, mounted on the turret. At times, a head may require repair or replacement. In prior art automatic stem machines, removal of a stem head from a turret requires considerable effort and time and involves considerable dismantling of the automatic stem making machine whereby the removal of one head renders the entire automatic stem making machine, including the remainder of the stem head assemblies, inoperative until the one head, which was removed for repair, is repaired or replaced. This results in a considerable number of hours during which the expensive machine is out of production.

It is, therefore, an object of this invention to provide an automatic stem making machine and a stem head therefor which provide improved means for stopping rotation of the head.

It is an object of this invention to provide an automatic stem making machine for making tube-attached stems and for ejecting the leads and the exhaust tube from the lower mold.

It is an object of the invention to provide a head assembly of practical size and including clean-out pins having a short stroke during clean-out action and an exhaust tube ejector having a much greater stroke.

It is an object of this invention to provide a head for an automatic stem making machine that can be removed as a unit from the turret of the machine by removing a small number of fastening means by which the head is held in place without dismantling the machine, whereby the machine may be made operable in a reduced length of time by substitution of heads.

It is an object to provide a head that can be readily removed from the automatic stem making machine of which it is a part without disabling the machine or interfering with its continuing operation using the remaining stem heads.

My machine embodying the invention involves a turret on which a number of stem heads are mounted. Each stem head includes a mold and a means, involving a centrally located gear to rotate the mold as well as cam operated means for stopping rotation of the mold at an indexed position of the turret and of the mold, and further cam operated means to move the leads with respect to the mold during fabrication of a stem, and to eject the finished stem including the leads from the mold at the conclusion of such fabrication.

According to one feature of the invention, as illustrated by a first embodiment of the machine, it includes means for making an exhaust tube-attached stem including a short stroke means for moving the tubulation vertically with respect to the stem during the manufacture of the tube-attached stem and also including long stroke means for ejecting the tube, or any broken part thereof, from the mold. According to another feature of the invention, a stem head is so mounted in the turret that by removal of a small number of fastening means, the complete stem head, including a pinion gear comprising a part of each head, may be lifted out of the turret and out of mesh with a central gear without further dismantling of the machine and without affecting the operation of the remainder of the machine or of the other heads thereof.

My invention may better be understood upon reading the following detailed description thereof taken with the drawings in which:

FIG. 1 is a perspective view of a vacuum tube stem of the type that can be made by my machine;

FIG. 2 is a vertical view in section of my machine taken through a turret ring;

FIG. 6 is a vertical central sectional view of a stem head of the machine of FIGS. 2 to 5;

FIG. 8 is a vertical central sectional view of another stem head which may be used in the machine of FIGS. 2 to 6.

Figure 3:
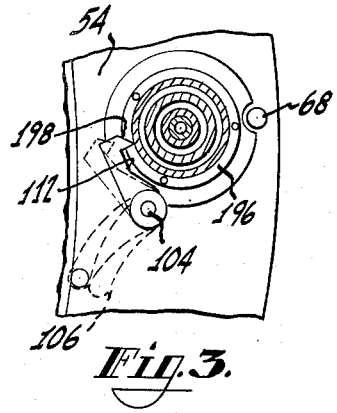
FIG. 3 is a sectional view on line 3—3 of FIG. 2.

FIG. 1 illustrates a stem of the type that can be made by my machine using the stem head of FIG. 6. In FIG. 1, the stem 10 comprises a disk 11 of glass through which a plurality of conductive pins or leads 12, extend parallel to each other and in a circular array through the glass disk 11. The glass is piled up in little mounds 13 through the center of each of which a corresponding lead 12 extends. An exhaust tube 14 is centrally attached to the disk 11 and a hole 15 in the disk 11 communicates with the inside of the tube 14. Stems such as that shown in FIG. 1 are used where the completed vacuum tube is exhausted by means of the exhaust tube 14. After exhaustion and at seal-off, the tube 14 is sealed at a point along its length and it is cut off beyond the seal. As shown in FIG. 1, the exhaust tube may be many times as long as the portion of the leads 12 that extend beyond the disk. Where exhaustion through the envelope of a vacuum tube occurs, the exhaust tube 14 may be omitted and in that case the stem 10 and disk 11 have no hole therethrough. Such a stem, having no exhaust tube and no hole therethrough may be made by the stem head assembly shown in FIG. 8.

Stems may be made on automatic machines which involve a turret and a number of heads mounted on the periphery of the turret. A general lay-out of such a machine is shown in FIG. 2. Turning to this figure, a table support 22 is provided and a turret 20 is mounted for intermittent rotation with respect thereto. A plurality of stem head assemblies 21, each of which comprises a stem head such as is illustrated in FIG. 6, is mounted for rotation on or near the edge of turret 20. As will be explained below, stem head assemblies 23, such as is illustrated in FIG. 8, may be mounted on turret 20 instead of stem head 21, upon slight change in the turret 20.

The turret 20 is mounted for indexed rotation about an axle 34. Means are provided for causing indexed motion of the turret, for causing rotation of the mold comprising the stem head 21 and for stopping the rotation of the mold. Means are also provided for causing proper vertical motions of the partially completed stem with respect to the mold and for causing proper vertical motion of the tube with respect to the mold and with respect to the partially completed stem. Means are also provided for ejecting the completed stem from the mold and for cleaning out the pin and the tube receiving holes.

*FIG. 2*

The turret 20 is mounted for rotation about central annular bearing support 24 on a bearing 25. The turret 20 comprises a downwardly extending annular indexing portion 26 attached thereto and rollers 28 (only one of which is shown) are fastened around the circumference of the annular portion 26. These rollers 28 cooperate with a drum gear 30 (shown in phantom) for causing indexed rotation of the turret 20 in a known manner upon rotation of drum gear 30. A central annular plate 32 is mounted for free rotation on central axle 34. The central axle 34 has a sun gear 36 fastened thereto to rotate therewith. The sun gear 36 meshes with planet gears 38 (only one of which is shown) mounted for free rotation on the central annular plate 32. A bull gear 40 is mounted for free rotation on axle 34 and comprises an internal ring gear 42 and an external ring gear 44. The internal ring gear 42 meshes with planet gears 38 whereby upon rotation of shaft 34 by a motor means (not shown) the bull gear 40 rotates. The purpose of the bull gear will be explained below.

The turret 20 further comprises a turret cone 46 fastened as by welding to a turret support ring 48 which is fixedly mounted on the central annular plate 32 of turret 20. The turret cone 46 has fixed thereon an outer annular ring 50 as by welding and the ring 50 has holes 52 therethrough evenly distributed around the periphery of the ring, there being one hole at each of the indexed positions of the turret. Also, mounted on the edge of and above the annular ring 50 is a turret ring 54. This turret ring 54 comprises a plurality of upstanding cylindrical housings 56 for the reception of the stem heads 21 to be described. The housings 56 comprise parts of turret ring 54 and may be integral therewith. Each cylindrical housing 56 has a smaller diameter cylindrical lower portion 58 which is cut away at 60 to receive teeth 44 of the bull gear 40. The cylindrical housing 56 has an upper, larger diameter portion 62 integrally fixed to the axially aligned lower portion 58. This upper cylinder housing has a vertical slot 64 in the radially outward surface thereof. A shaft 66, having a small upper portion 68 threaded into a larger lower portion 70, is mounted for sliding motion in bearings 72 and 74 respectively on the radially outward surface of the enlarged portion 62 of upstanding housing 56. The lower bearing 74 is fastened to the larger diameter cylinder portion 62 as by cap screws so that the shaft 66 may be removed when necessary for repair purposes. More details of the shaft 66 and its purpose will be found below.

A conical cover plate 76 is fastened to the turret ring 54 and covers the whole central portion of the turret 20. Only a portion of this cover plate 76 is shown in the drawing.

A stationary annular track support 78 is mounted on table support 22 by means of several support parts generally indicated by the reference character 80. The track support 78 supports three cam tracks 82, 84 and 86. The cam tracks 84 and 86 are vertically directed and are concentrically mounted on track support 78. The cam track 82 is also concentrically mounted with respect to tracks 84 and 86, but cam track 82 is horizontally mounted on track support 78 by support means 88, with its cam surface directed radially outward. Two levers 90 and 92, which move in a vertical plane about the common pivot pin 94 (see FIG. 5) are mounted on outer annular ring 50. Two rollers 96 and 98 are mounted on the end of lever 90. One roller 96 rides on track 84 and one roller 98 cooperates with the stem head as will be described below. The other lever 92 similarly carries the rollers 100 and 102 on the end thereof. One roller 100 rides on its cam track 86 and the other roller 102 cooperates with the shaft 66 in a manner to be described. A different pair of levers 90 and 92 and pivot pins 94 and their respective rollers are supplied for each of the several upstanding cylindrical supports 56. Since the pivot pins are mounted on ring 50, the levers 90 and 92 move with their corresponding upstanding cylindrical support 56.

Figure 5:
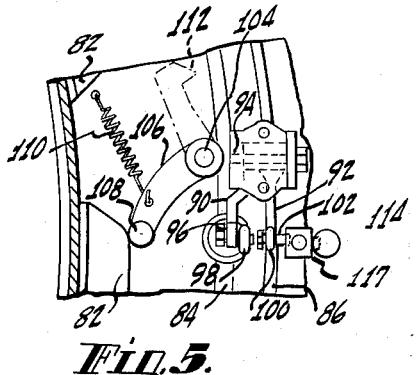
FIG. 5 is a sectional view on line 5—5 of FIG. 2.

A vertical rod 104 (see FIG. 5) is supplied for each indexed position of the turret 20. This vertical rod 104 extends through the outer annular ring 50. This rod 104 also extends through the turret ring 54 between the upstanding cylindrical supports 56 as shown in FIG. 3. The lower end of this rod 104 has a lever 106 fastened thereto and a roller 108 is fastened on the end of lever 106. The roller 108 is urged into contact with the horizontal cam tracks 82 by means of spring 110 under tension and fastened between lever 106 and the outer annular ring 50. The upper end of rod 104 has a head lock arm 112 fastened thereto. This lock arm 112 is urged clockwise by spring 110 and where the cam track 82 is interrupted (as shown in FIG. 5) the lock arm is swung into position shown in solid lines in FIG. 3 to stop rotation of the stem head and mold, as will be explained more fully hereinafter.

A vertically positioned ejecting push rod 114 (see FIG. 2) is supplied at one position only of the turret 20, that is at the clean-out position thereof. This push rod 114 has a notch 116 in the side thereof, said notch being directed radially inward. This notch 116 receives a projecting portion of a lifting block 117 fastened to the lower end 70 of shaft 66, whereby, upon actuation of rod 114 upward and downward by means (not shown) the rod 66 is also pushed up and down correspondingly. The lifting block 117 also has a projecting portion which overlies roller 102 on lever 92 for a purpose to be described below.

A different stem head 21 such as shown in FIG. 6 is mounted in each upstanding cylindrical housing 56 of FIG. 2. As is noted by the reference to FIG. 6 and the following explanation thereof, this stem head may be fixed into operative position in the upstanding cylindrical housing 56 by a minimum number of fastenings and conversely may be removed from the housing 56 upon removal of these fastenings and without affecting the operation of the automatic stem machine of which it is a part.

The stem head 21, shown in FIG. 6 comprises a cylindrical housing 118 having a flange 120 at its upper end and a slot 122 in the housing 118 parallel to the axis of the cylindrical housing 118. The upper flange 120 has three counter-sunk bolt holes 124 along the periphery thereof, only one of which is shown, for mounting the stem head in the cylindrical support 56 of FIG. 2. An upper ball bearing 126 is mounted within the housing 118 at the top thereof and a lower ball bearing 128 is mounted in the housing at the lower end thereof. A spindle 130 internally bored to different diameters, is mounted for rotation in the ball bearings 126 and 128. This spindle 130 has externally cylindrical portions; an enlarged diameter upper portion 132 which is externally threaded, a smaller diameter, first intermediate portion 134 comprising a shoulder 135 which abuts the upper surface of the bearing 126, a still smaller, lower, second intermediate portion 136 extending between the bearings 126 and 128, and a smallest diameter, lowest portion 138 of the spindle 130 extending below the bearing 128. The second intermediate portion 136 of the hollow spindle 130 has a pair of diametrally opposed slots 140 in the walls thereof and each parallel to the axis of the spindle for reception of the sliding ejection rod key 142, as will be explained below. The upper and largest of the bores in the spindle 130 is large enough to contain a portion of a flange 144 of a stem mold 146, the mold spacer 148 and the flange 150 of a lead locator sleeve 152. The clamp ring 154 is screwed down over the upper end 132 of the spindle 130 to hold the mold 146, the spacer 148 and the sleeve 152, in position. The next lower, next smaller bore 164 of the spindle 130 contains the lower end of the lead locator sleeve 152 and at the lower end of the smaller bore 164, the upper flange 156 of a hollow ejecting rod 158. Clean-out pins 160, a different one for each hole in the locating sleeve 152, are mounted in a clean-out pin base 162 which is itself secured to the ejecting rod flange 156. The lower end of a rod 170, the exhaust tube ejector, is fastened to the key 142 by means of fitting 174. The upper end of rod 170 slides in a hole through the stem mold 146 for a purpose to be described. A sleeve 176 slidingly fits the lower inside portion of cylindrical housing 118. An annular spacer block 178 fits between the sleeve 176 and the spindle 130 at the second intermediate portion 136 thereof. The key 142 is pressed against spacer block 178 by flange 180 fastened to the top of spacer 178 by means of screws 182. A flange 184 is similarly fastened to the bottom of spacer 178. The flange 184 abuts the bottom of sleeve projection 186. A shoulder 188 on the spacer 178 abuts the projection 186 whereby the sleeve 176, the spacer 178, the key 142 and the exhaust tube ejector 170 move up and down together. An actuating key 190 is fastened to sleeve 176 and slides in slot 122 of housing 118. The ejector 170 and its ejecting rod key 142 rotates with the spindle 130 since key 142 slides in slots 140 of spindle 130. The spacer 178 and the actuating key 190 and sleeve 176, which are fastened together are prevented from rotation by the actuating key 190 being slidably mounted in slot 122 of the stationary housing 118. The actuating key 190 has an outwardly projecting tongue 193 integrally fastened thereto for cooperation with the rod 66 shown in FIGS. 2, 3, 4 and 7. Therefore, upon sliding key tongue 193 vertically up and down in slot 122 as will be explained below, ejector 170 will move up and down in rotatable stem mold 146 and clean out the exhaust tubulation hole therein.

At a point above the housing 118, the spindle flange 194 is fastened to the spindle 130. Head lock collar 196 is fastened to the spindle flange 194 by bolt means 200. This head lock collar 196 has a portion thereof cut away as shown in FIG. 3 for cooperation with the hook end 198 of the head lock arm 112. Slots are provided in flange 194 for bolts 200 to permit annular adjustment of the head lock collar 196 with respect to the stem mold 146. A bearing holder 204 is fastened to the top of the flange 120 of the housing 118 for holding the bearing 126 in place in the housing 118. A stop ring 206 prevents downward motion of the bearing 126.

Also mounted on spindle 130 but below the housing 118 is a friction clutch 207. This friction clutch comprises an upper member 208 keyed as at 210 to the spindle 130. The upper member 208 has axially directed holes in a main portion into which springs 212 (only one of which is shown) are placed. The upper member 208 comprises a downwardly extending collar 209. Pins 214 (only one of which is shown) project down from the main portion of the upper member and extend into an upper friction disk 215 which surrounds the collar 209. A pinion gear 216 is rotatably mounted on spindle 130 below the upper member 208 by means of bearing 218 and the gear 216 surrounds the lower end of collar 209. The pinion gear 216 has a lower friction disk 219 fixed to pinion 216 by pins 220. Thereby, the rotation of pinion 216 causes rotation of mold 146 by frictional drive through disks 219 and 215, driving member 208 and through key 210 and the spindle 130. Upon holding of head lock collar 196 (FIG. 3), the mold 146 and spindle 130 cease to turn while the pinion gear 216 driven by bull gear 40 continues to rotate with the disks 215 and 219 slipping.

A lock nut 222 and a lock washer 224 hold the bearing 218 in place on spindle 130. Since the pinion gear 216 comprises a portion which extends over the top of bearing 218, the gear 216 is also held in place thereby. A follower 226 is threaded on the bottom end of the ejection rod 158. A lock nut 228 threaded on rod 158 locks the follower 226 in place. A spring 230 is fitted between the follower 226 and lock nut 222 to urge the ejecting rod 158 downwards with respect to the spindle 130.

It will therefore be noted that, as follower 226 is pushed up, as explained below, the leads in the lead holes in mold 146 will be pushed up and similarly as tongue 193 is pushed up the exhaust tube in the hole provided therefor in mold 146 will be pushed up. Upon sufficient upward motion of pin ejecting rod 158 and tube ejector rod 170, the lead holes and the tube hole will be cleaned out. For clean out, the tube ejector rod 170 moves about five times as far as the pin ejector rod 158 and much further than when working the exhaust tube up and down while it is being affixed to the glass disk of the completed tube stem.

The means for actuating the exhaust tube ejector 170 involves the shaft 66 (FIG. 2) and the parts cooperating therewith.

Figure 4:
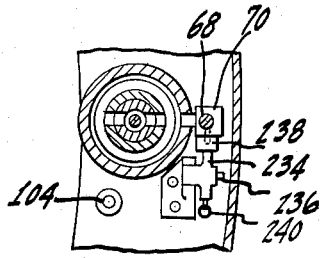
FIG. 4 is a sectional view on line 4—4 of FIG. 2.
Figure 7:
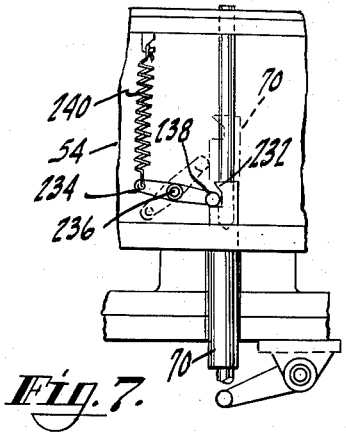
FIG. 7 is an elevational view of the exhaust tube ejector actuating mechanism used with the stem head of FIG. 6.

Means are provided for urging shaft 66 downward against the roller 102 mounted on the end of lever 92 and thereby keeping the follower wheel 100 in contact with its cam track 86, whereby the exhaust tube will be manipulated up and down during fabrication of the stem. This means includes provisions for pushing shaft 66 beyond the stem working positions and to the tube hole cleaning position. Referring to FIGS. 2, 4 and 7 the enlarged lower portion 70 of rod 66 has a rectangular notch 231 in an inward surface thereof to cooperate with actuating key tongue 193 forming part of the head assembly 21. A notch 232, which has a flat bottom wall and a sloping top wall is also formed in the top of enlarged rod portion 70 and communicates with notch 231. The notch 231 is directed radially inwardly as shown in FIG. 2; the notch 232 is directed laterally to the left as shown in FIG. 7. A lever 234 is mounted to pivot on a pivot pin 236 on the outward surface of turret ring 54. A roller 238 at one end of lever 234 is held down against the floor or flat bottom wall of the notch 232 by spring 240 fastened under tension between the other end of lever 234 and a point on turret ring 54. The pressure of the roller 238 on the floor of the notch 232 keeps the lifting block 117 (FIG. 2) pressed down against the roller 102. However, when push rod 114 pushes the shaft 66 upward, lever 234 (FIG. 7) will move counterclockwise until roller 238 on the end of lever 234 leaves notch 232 and rides on the side of the enlarged portion 70 of push shaft 66. At such time, the lever 234 takes the position shown in dotted lines in FIG. 7 and does not push downward on shaft 66. When push rod 114 (FIG. 2) pulls shaft 66 downward, the notch 232 (FIG. 7) in shaft 66 arrives at such a position that the roller 238 enters the notch and presses against the floor thereof. Thereby, the shaft 66 is biased downwardly during a small, lower part of its travel, but may be pushed upward out of this downward control of the spring 240 and of the lever 234 during the exhaust tube cleaning-out operation of the machine.

When it becomes necessary to take a head assembly such as 21 out of housing 56, the screws (FIG. 6) holding the flange 120 in place are removed, the rod 68 (FIG. 2) is screwed out of enlarged head 70 and the screws holding removable bearing 74 to housing 56 are loosened so far as to disengage tongue 193 from notch 231. Then the actuating key 190 (FIG. 6) is removed by removing the bolts 192. Then the whole assembly 21 may be removed as a unit from the automatic stem making machine and the machine will continue to operate using the other heads that are in place on the stem machine. A new stem is inserted by reversing the process.

Having described the stem machine 21 shown in FIG. 6, the stem head 23 shown in FIG. 8 will be described. The stem head 23 differs from the stem head 21 in that the stems made by stem head 23 include no exhaust tube. Therefore the stem head 23 is simpler and shorter than stem head 22 since it requires no means to push the exhaust tube up during the heating step and to eject the tube (if broken off in the head) during the clean-out of the head. The head 23 will be described by comparing it with head 21 and as far as is possible, the same reference characters, primed however, will be used to indicate parts of heads 23 that correspond to parts of head 21.

Turning to FIG. 8, a cylinder housing 118′ is provided. This cylinder housing has an upper flange 120′ integrally fastened thereto and having two bearings 126′ and 128′ therein. The spindle 130′ rotates in bearings 126′ and 128′, and a spacer tube 242 is provided to space the two bearings. The lower stem mold 146′ is held in an enlarged top-most bore of the spindle 130′ by clamping ring 154′ threaded on the top of spindle 130′, a mold spacer 148′ being provided beneath the mold 146′. A pin 244 extends through the edge of the mold 146′ and through the washer 148′ and into the spindle 130′ to keep the mold in fixed annular position with respect to spindle 130′. Pin ejectors 160′ mounted on pin base ring 162′ extend into the holes in the mold 146′ which are provided for the tube stem leads. The pin base ring 162′ is fixed in a known manner to the pin ejecting rod 158′. The pin ejecting rod 158′ is slidable in the bore 164′ in the spindle 130′, but is prevented from turning therein by key 246, which extends through lock nut 222′ into a key-way in ejecting rod 158′. The lock nut 222′ is threaded on spindle 130′ at the lower end thereof. A further lock nut 248 and a lock washer 224′ holds lock nut 222′ in position on spindle 130′. A friction clutch 207′ is inserted between the lower bearing 128′ and the upper lock nut 222′. This friction clutch comprises an upper spring plate 208′, key 210′, springs 212′, pins 214′, and upper friction disk 215′, as well as the lower friction disk 219′, pins 220′ and pinion 216′ arranged as the similar elements are arranged in FIG. 6 and for operation in the same manner. The spindle 130′ also comprises spindle flange 194′ and stop flange 196′ which cooperate with spindle 130′ and with the lock arm such as that shown at 112 in FIG. 3 as do the similar parts of FIGS. 2, 3, 5 and 6. A spring support 250 is threaded on the lower end of ejecting rod 158′ and a holder 252 is also threaded on the lower end of ejector 158′ and jams against spring support 250 to keep them both in position on ejector 158′. A spring 230′ is mounted between lock nut 248 and spring support 250 to urge the ejector downward. A follower 254 is mounted at the end of holder 252. During operation of the automatic stem machine using head 23, the follower 254 rides on its cam track such as 84 in FIG. 2.

The stem head 23 in FIG. 8 is mounted in a cylindrical housing such as 56 in FIG. 2, slight dimensional changes to make the housing fit the head 23 being necessary. Since the only changes in the turret used with the head 23 of FIG. 8 over that used with the head 21 of FIG. 6 is by way of omission of exhaust tube ejector operating means comprising track 86 and rod 114 and shaft 66 and the parts particularly pertaining thereto, no specific illustration or detailed explanation of a turret for mounting the head of FIG. 6 is thought necessary. It is noted that (except of dimensional fitting) the stem head 23 of FIG. 8 may be mounted in the housing 56 of FIG. 2 and proper operation of the head 23 would take place, the lever 92, the track 86 and the rod 114 and the parts operated thereby merely being unnecessary and performing no function in the operation of the head 23.

Having explained my two stem heads and the turret with which they cooperate, the operation thereof will now be explained.

The turret 20 has a plurality, usually thirty heads, such as that of FIG. 6, for example, mounted therein. For convenience, the indexed positions of the turret will be numbered. The turret is rotationally indexed by cam 30 to the first or pin loading position where a plurality, usually 7 or 9, pins or leads are dropped (either manually or automatically) into the lead holes in the lower mold 146. These leads fall into the mold until the ends thereof abut the upper ends of the ejector pins 160. The turret is then indexed to a second or detector position where it is determined (by a means not shown) whether a full complement of leads is present in the lower mold. The turret is then indexed to the third position where a glass cylinder is put on the mold 146 concentric with the circle of leads, if the detector finds that the mold contains the required number of leads. The turret is then indexed to its fourth position where an exhaust tube is dropped down into the hole provided therefor in the lower mold 146 and in the lead locator sleeve 152, the lower end of the tube abutting against the upper end of the exhaust tube ejector rod 170. At these loading and detecting positions of the turret, the cam track 82 is cut away, as shown for example in FIG. 5, to the point where lever 106 is pulled by spring 110 in a clockwise direction, rotating rod 104 and therefore head lock arm 112 in a clockwise direction. The hook end 198 of head lock arm 112 falls into a slot in head lock collar 196 preventing the spindle 130 from rotating and causing slipping of the friction clutch 207. The bull gear 40 (FIG. 2), however, continues to rotate and causes rotation of pinion 216. Then, at the fifth indexed position of turret 20, the cam 82 causes head lock arm 112 (FIG. 5) to rotate counterclockwise out of contact with head lock collar 196 and the spindle 130 rotates. At this fifth position of the turret, flame is applied to the glass cylinder and to the pins or leads and to the top of the exhaust tube, which are all rotating with the spindle. After proper heating and after further indexing, the turret is indexed to the first pressing or sixth position. At this position, the spindle is prevented from rotating by said lock arm 112 and an upper mold (not shown) comes down and presses or shapes the softened glass cylinder to the point where it surrounds the leads. Also by this softening and pressing action, the glass cylinder is at least partially fixed to the centrally located exhaust tube. The upper mold is actuated upwards and the turret 20 is moved to its next or seventh position. In moving to the seventh position, the tracks 84 and 86 raise slightly. Raising of the track 84 has the effect of raising pin ejector 158 and clean-out pins 160 slightly, carrying with it the leads and the partially molded glass cylinder. The raising of track 86 causes raising of tube ejector 170, whereby the exhaust tube is also raised slightly. Also, at this seventh position the cam 82 causes the head lock arm 112 to release the spindle 130, whereby the mold and the parts mounted thereon rotate. The flame, at this seventh position of the head, gets under the partially formed glass cylinder and heats it uniformly. The flame also has access to the upper part of the tube that is being joined to the partially formed glass cylinder. Upon proper heating, the turret indexes to the eighth position, the head lock arm 112 again stopping rotation of the spindle, and the top of the cams 84 and 86 become lower, permitting the partially completed stem to contact the top of the mold 146. The upper mold, at the eighth position, comes down and shapes the glass cylinder more nearly to its final shape. Further heatings and pressings may take place in making a stem, as necessary. When the stem is completed, the turret is indexed to its unloading position at which point the head lock arm 112 stops rotation of the spindle, the pins and leads comprising part of the stem are raised by cam track 84, and the exhaust tube is raised a similar amount by the cam track 86. A transfer device (not shown) removes the completed stem from the head 21 and then the turret is indexed to its clean-out position. At the clean-out position, the cam 84 raises the ejector pins 160 to a position flush with the top of mold 146 and a means (not shown) pushes the rod 114 upward. The notch 116 in the rod 114 engages the lifting block 117 and pushes the shaft 66 upwards. The rectangular notch at 231 in the top end of the enlarged portion 70 of shaft 66 pushes actuating key tongue 193 upwards. As the key 193 goes upwards it pushes exhaust tube ejector 170 upwards to clean out the tube hole in the locator sleeve 152 and in the stem mold 146. Also, as rod 66 goes upward, the floor of notch 232, FIG. 7, pushes lever 234 counterclockwise against the urging of spring 240 attached thereto until the roller 238 at the end of lever 234 rides out of the notch 232 and on the side of enlarged rod portion 70. When the pin holes and the tube hole have been cleaned out, compressed air means (not shown) blows the cleaned out matter off the top of head 21. Means (not shown) pulls the rod 114 downward to its inactive position, pulling the rod 66 and the ejector pin 170 to its lowest position. The roller 238 enters its notch 232 and spring 240 acting on lever 234 urges rod 66 downward so that the lifting block 117 on the lower end of rod 66 rides on its roller 102. The cycle is thus complete.

No detailed explanation of the operation of my head 23 of FIG. 6 in its turret appears necessary. Its operation is similar to that explained, except that all reference to an exhaust tube or to the cleaning out of the exhaust tube hole is omitted. It will be noted, however, that either of the stem heads may be dropped into a cylindrical fitting of a turret, that both comprise gears that engage a bull gear by the mere insertion of a head into its fitting, and that each involve similar lead feeding, raising, and cleaning out, and similar rotation stopping means similarly positioned below the stem mold and out of the heating area of the head. It will be further noted that each stem may be removed from its turret expeditiously and without interfering with the operation of other stem heads, and that a stem head may be restored to an operative position on the turret just as expeditiously.

What is claimed is:

1. In a vacuum tube stem making machine, an indexable turret, means for indexing said turret, holes in said turret at indexable positions thereof, a bull gear concentric with said turret, a plurality of stem head assembly units each comprising a pinion gear of a size that passes through said holes, and means for detachably fastening each of said units to said turret with the pinion gear extending through one of said holes and in mesh with said bull gear.

2. In combination: an indexable turret, a stem-head assembly removably mounted on said turret, said stem-head assembly comprising an open-ended cylindrical housing containing a vertically extending slot in the surface thereof, a vertically extending hollow spindle rotatably mounted in said housing and protruding beyond the lower open end of said housing, a mold fixed to the upper end of said spindle, said mold being adapted to support a glass stem button and containing a hole dimensioned to receive a glass exhaust tube to be joined to said button upon the application of heat and an axial vibratory movement to said exhaust tube, an exhaust ejector rod mounted in said hollow spindle in register with said exhaust tube hole to permit of said vibratory movement and also slidable movement into said hole a distance sufficient to clean out any glass therein, a shaft having a plurality of notches therein and supported for vertical movement on said turret parallel to the axis of said ejector rod, an ejector actuating key fixed to said ejector rod and slidably mounted in said slot with its outer end in a position to be engaged in one of said notches, cam means for imparting said vibratory movement to said exhaust tube through said rod and key, a spring actuated lever mounted on said turret and adapted to engage another of said notches for biasing said shaft into engagement with said cam, means for moving said shaft out of engagement with said cam against the force of its bias and thence through the distance required to move said ejector rod into said exhaust tube hole the distance required to clean-out any glass in said hole.

References Cited by the Examiner
UNITED STATES PATENTS

| | | | |
|---|---|---|---|
| 2,030,186 | 2/36 | Rose | 65—140 |
| 2,494,923 | 1/50 | Yoder et al. | 65—110 X |
| 2,554,982 | 5/51 | Hartley et al. | 65—138 X |
| 2,691,246 | 10/54 | Roeber | 65—140 |
| 2,718,095 | 9/55 | Reiter et al. | 65—140 |
| 2,805,745 | 9/57 | Patzer | 192—138 |

DONALL H. SYLVESTER, *Primary Examiner.*

ARTHUR P. KENT, *Examiner.*